United States Patent
Manzano Macho et al.

(10) Patent No.: US 9,251,211 B2
(45) Date of Patent: Feb. 2, 2016

(54) GENERATION OF A QUERY PLAN FOR ACCESSING A DATABASE

(75) Inventors: David Manzano Macho, Madrid (ES); Luis Maria Lafuente Alvarez, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 97 days.

(21) Appl. No.: 13/817,638

(22) PCT Filed: Oct. 1, 2010

(86) PCT No.: PCT/EP2010/064643
§ 371 (c)(1),
(2), (4) Date: Feb. 19, 2013

(87) PCT Pub. No.: WO2012/041388
PCT Pub. Date: Apr. 5, 2012

(65) Prior Publication Data
US 2013/0159286 A1    Jun. 20, 2013

(51) Int. Cl.
*G06F 17/30* (2006.01)
(52) U.S. Cl.
CPC ...... *G06F 17/30463* (2013.01); *G06F 17/3048* (2013.01); *G06F 17/30457* (2013.01); *G06F 17/30935* (2013.01); *G06F 17/30938* (2013.01)
(58) Field of Classification Search
CPC .............. G06F 17/30442; G06F 17/30451; G06F 17/30463
USPC ................................ 707/718, 719, 720, 721
See application file for complete search history.

(56) References Cited

U.S. PATENT DOCUMENTS

| | | |
|---|---|---|
| 7,596,559 B2 | 9/2009 | Popa et al. |
| 2007/0050328 A1* | 3/2007 | Li et al. ............................ 707/2 |
| 2009/0030888 A1* | 1/2009 | Sahu et al. ....................... 707/5 |
| 2009/0106321 A1* | 4/2009 | Das et al. ..................... 707/200 |
| 2009/0177667 A1* | 7/2009 | Ramos et al. ................. 707/100 |
| 2009/0281992 A1 | 11/2009 | Bestgen et al. |
| 2009/0319475 A1* | 12/2009 | Bestgen et al. .................... 707/2 |
| 2010/0306188 A1* | 12/2010 | Cunningham et al. ........ 707/713 |

OTHER PUBLICATIONS

International Search Report for PCT/EP2010/064643 mailed Dec. 30, 2010.
Written Opinion of the International Searching Authority mailed Dec. 30, 2010.
I. Bowman et al., "Semantic Prefetching of Correlated Query Sequences", Data Engineering, 207, ICDE 2007, IEEE 23$^{rd}$ International Conference, Apr. 1, 2007, pp. 1284-1288.

(Continued)

*Primary Examiner* — Khanh Pham
(74) *Attorney, Agent, or Firm* — Nixon & Vanderhye, P.C.

(57) ABSTRACT

A method of generating a query plan for accessing a database, comprising: receiving (S10) one or more electronic queries from a database client; and determining (S20) whether the received one or more queries form a part of a query pattern comprising a repeating sequence of a plurality of queries by determining whether the received one or more queries match a part of the sequence of queries. If the received one or more queries are determined to form a part of the query pattern, the method further comprises generating (S30) a query plan for executing one or more queries in the sequence that match the received one or more queries, and a query that is subsequent to the matching one or more queries in the sequence.

15 Claims, 9 Drawing Sheets

(56) References Cited

OTHER PUBLICATIONS

I. Bowman et al., "Semantic Prefetching of Correlated Query Sequences", Technical Report, University of Waterloo, School of Computer Science, Nov. 21, 2006, pp. 1-12.

W.S. Zhang et al., "Art Based Predictive Caching System for XML P2P Database", Lecture Notes in Computer Science, vol. 3532, Jan. 1, 2004, pp. 3-10.

A. Hamid et al., "Optimization of Semantic Caching for XML Database", Information and Communication Technologies, 2005, Aug. 27, 2005, pp. 201-205.

L. Chen et al., "XCache-A Semantic Caching System for XML Queries", Proceedings of the ACM Sigmod International Conference on Management of Data, Jun. 3-6, 2002, Jun. 3, 2002, p. 1.

L. Chen et al., "ACE-XQ: A CachE-Aware XQuery Answering System", Internet Citation, Jun. 6, 2002, pp. 1-6.

Sven Groope et al., "Reformulating XPath Queries and XSLT Queries on XSLT Views", University of Paderborn, Paderborn, Germany, Data & Knowledge Engineering 57, 2006, pp. 64-110 (42 pages total).

* cited by examiner

GENERATION OF A QUERY PLAN FOR ACCESSING A DATABASE

This application is the U.S. national phase of International Application No. PCT/EP2010/064643 filed 1 Oct. 2010 which designated the U.S., the entire contents of which is hereby incorporated by reference.

TECHNICAL FIELD

The present invention relates to the general field of database systems and, more specifically, to the generation of a query plan for accessing a database on the basis of a received electronic query from a database client.

BACKGROUND

One of the characteristic features of many existing database systems that serve a large number of users, such as those used in telecommunications systems, is the need to store a substantial amount of data items of various different types for each of a huge number of users (e.g. subscribers) of these systems. For example, the data may include location data associated with a mobile system subscriber, which is required to determine routing information for setting up a call session to the subscriber's registered terminal. Alternatively, the data may be service-controlling data associated with the subscriber, which may be used to determine whether a terminating call should be diverted to a further destination and/or whether an originating call can be permitted, depending on the location. The identifiers of one or more terminals that are used by a subscriber may also need to be stored.

In the telecommunications environment (that is to say, networks and technologies related to telecommunications), the so-called "Data Layered Architecture" (DLA) is expected to become the deployment of choice for telecommunication operators. In short, the principle underlying DLA lies in decoupling specific application service logic (or "business logic") for providing a service from the management of the data necessary to provide that service. This logical separation allows the application service logic and the data storage logic to be developed and maintained as modular components, which can be distributed over a number of separate platforms.

For example, a legacy "monolithic" network node, which includes a processing means programmed with appropriate logic to provide certain services using data stored in a data store that is integral to the node, can be converted into a DLA-compliant node by distributing its functionality among a number of application servers (widely referred to as front-ends, FEs) hosting the service logic, and a centralised data repository (which can comprise one or more back-end (BE) database systems) storing the data which the application servers use to provide their services.

An example of a monolithic node that can be converted into a front-end according to the Data Layered Architecture is a Home Location Register (HLR) of a mobile communications system, or a Home Subscriber Server (HSS) of an Internet Protocol Multimedia Subsystem (IMS). In these examples, any of the database systems commercially available today can be used as a back-end storage system making up the centralised data repository which serves the front-ends. In this kind of scenario, the front-ends become (standard) database clients of the back-end database system(s).

The DLA is just an example of a software architecture that may be employed in a system comprising a centralised database repository and one or more database clients each providing an application service by reading and/or modifying data which relates to that service and is stored in the database repository.

Although the software interfaces of the database client and the database repository's database management system (DBMS) are compatible with one another in a DLA-compliant system, this will generally not be the case for other types of systems. This incompatibility can present an obstacle if the front-ends demand flexible solutions allowing their integration with different back-ends. Similarly, back-ends may need to be integrated with applications other than those for which they were initially designed. Therefore, front-ends may rely on (source) data schemas and/or use (source) access protocols different from those (target) schemes and/or protocols offered by the back-ends. In these scenarios, a middleware layer function implementing the query reformulation process would be needed. However, this results in an extra penalty in performance, namely the latency in serving database queries that is caused by the middleware layer function reformulating the queries.

With the general aim of reducing the latency in serving database queries from database clients, efforts have so far focussed on reducing the latency which is introduced by the so-called query reformulation processes and, in general, on optimizing the process of serving a query by a database, by means of ad-hoc procedures.

For instance, one approach to speeding up the query reformulation process is to compile the data model mapping. With this approach, it is not necessary to parse the file containing the mappings every time a new query has to be reformulated. Another approach is to cache the transformation for each query issued by the front-end to avoid the time-consuming process of transforming that query into a format understandable by the BE and vice versa. For example, the transformation rules may be cached in a memory in order to reduce the time spent selecting the corresponding transformation rule for the input query.

Other known approaches seek to optimize the query plan to be executed in the database, in terms of a cost-based function. This is a common goal of query planners deployed within a DBMS, especially in relational databases. For example, when a query is submitted to the database, a query planner can evaluate some of the different, correct possible plans for executing the query and return what it considers to be the best alternative (normally in terms of cost-based considerations, such as the number of required accesses to a hard drive). Incidentally, the term "query plan" used herein takes its usual meaning in the art (where it is often also referred to as a "query execution plan"), as being an ordered set of steps (which may be expressed in any suitable database language) that can be performed by an interface to a database, such as a DBMS, so as to execute a query requested by a client of the database.

There are, however, several drawbacks with the aforementioned approaches for controlling the latency introduced by query reformulation process and, in general, for optimizing the query processing itself.

With the approach of compiling the data model mapping, the reduction in latency might be poor when it comes to reformulating complex queries and in cases where the model mapping is far from simple.

In the case of caching transformation rules, if the number of queries or their types are very high, the size of the cache required to store all possible transformations will introduce an extra latency owing to the need to manage a huge memory and to control the consistency of every transformation (cache controlling and data consistency).

Query planners and their corresponding optimizing functions are usually deployed within the DBMS, since they need a very detailed knowledge of the physical database design (normally in terms of the number of accesses to the hard disk) in order to optimize energy consumption and/or processing time. However, this kind of solution is difficult to implement in scenarios where multiple back-end databases are present (particularly, in a database federation) and they are basically intended for relational databases.

Accordingly, despite the efforts summarised above, there still remains a great need to find ways of reducing the latency in serving database queries from one or more database clients, particularly in applications such as those in the telecoms environment where the database clients often demand real-time data access.

SUMMARY

In view of the shortcomings of the prior art mentioned above, the present inventors have sought a means of improving the performance of a database storage system as perceived by a database client, and in so doing have arrived at a method of generating a query plan for accessing a database according to the present invention. The method includes receiving one or more electronic queries from a database client, and determining whether the received one or more queries form a part of a query pattern comprising a repeating sequence of a plurality of queries by determining whether the received one or more queries match a part of the sequence of queries. If the received one or more queries are determined to form a part of the query pattern, the method further comprises generating a query plan for executing one or more queries in the sequence that match the received one or more queries, and a query that is subsequent to the matching one or more queries in the sequence.

The present invention also provides an apparatus operable to generate a query plan for accessing a database. The apparatus comprises a receiver operable to receive one or more electronic queries from a database client, and a pattern detection unit which is operable to determine whether the received one or more queries form a part of a query pattern comprising a repeating sequence of a plurality of queries by determining whether the received one or more queries match a part of the sequence of queries. The apparatus also includes a query plan generator operable to generate a query plan for executing one or more queries in the sequence that match the received one or more queries, and a query that is subsequent to the matching one or more queries in the sequence.

The present invention also provides a computer program product, comprising a computer-readable storage medium or a signal carrying computer program instructions which, if executed by a processor, cause the processor to perform a method as set out above.

The present invention as summarised above is based on the inventors' insight that the performance of a database storage system (in particular, the data retrieval speed) as perceived by a database client can be improved considerably by exploiting the existence of a query pattern when generating, on the basis of a query received from the database client, a query plan for accessing the database.

Such query patterns, which comprise a repeating sequence of a plurality of queries, were found to arise in many different database applications. For example, in the telecoms environment, database clients usually interface a signaling network (e.g. the core IP Multimedia Subsystem) having a thoroughly standardized, clearly defined set of request/response message sequences. The order in the occurrence of these network events was often found to give rise to an ordered, predictable structure in the sequences of database queries submitted by the database clients. Predictable query patterns may also be encountered in database query sequences submitted during electronic banking transactions and in many other scenarios.

In many cases of practical interest, it was found that a query submitted by a database client tends to be associated with a single query pattern. In these cases, it is possible to establish whether a query received from a database client forms a part of a query pattern simply by determining whether the received query matches a query in the sequence of queries in the query pattern. However, in other cases, more than one query may need to be received and compared with a part of the sequence of queries in a query pattern in order to determine whether the received queries match a part of the sequence, and thus form part of a query pattern. Thus, it is possible to dynamically determine from one or more received queries of an incoming sequence of queries whether the incoming queries will have a recognized pattern.

If the received one or more queries are determined to form a part of the query pattern a query plan is generated for executing not only one or more queries in the sequence that match the received one or more queries, but also a query that is subsequent to the matching one or more queries in the sequence. In this way, a query plan can be generated which as predictive potential. In other words, the query plan may be used to predict and execute in advance queries that are yet to be received.

Accordingly, in an embodiment of the present invention, the generated query plan can advantageously be used to retrieve in advance the data that is yet to be requested in one or more subsequent, not yet received, queries and store the retrieved data in a memory cache. Thus, the performance of the database system as perceived by the database client can be improved. This contrasts with conventional approaches, in which correlations between queries in a sequence are overlooked and the queries are dealt with on an individual basis, independently of one another.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Figure 1:
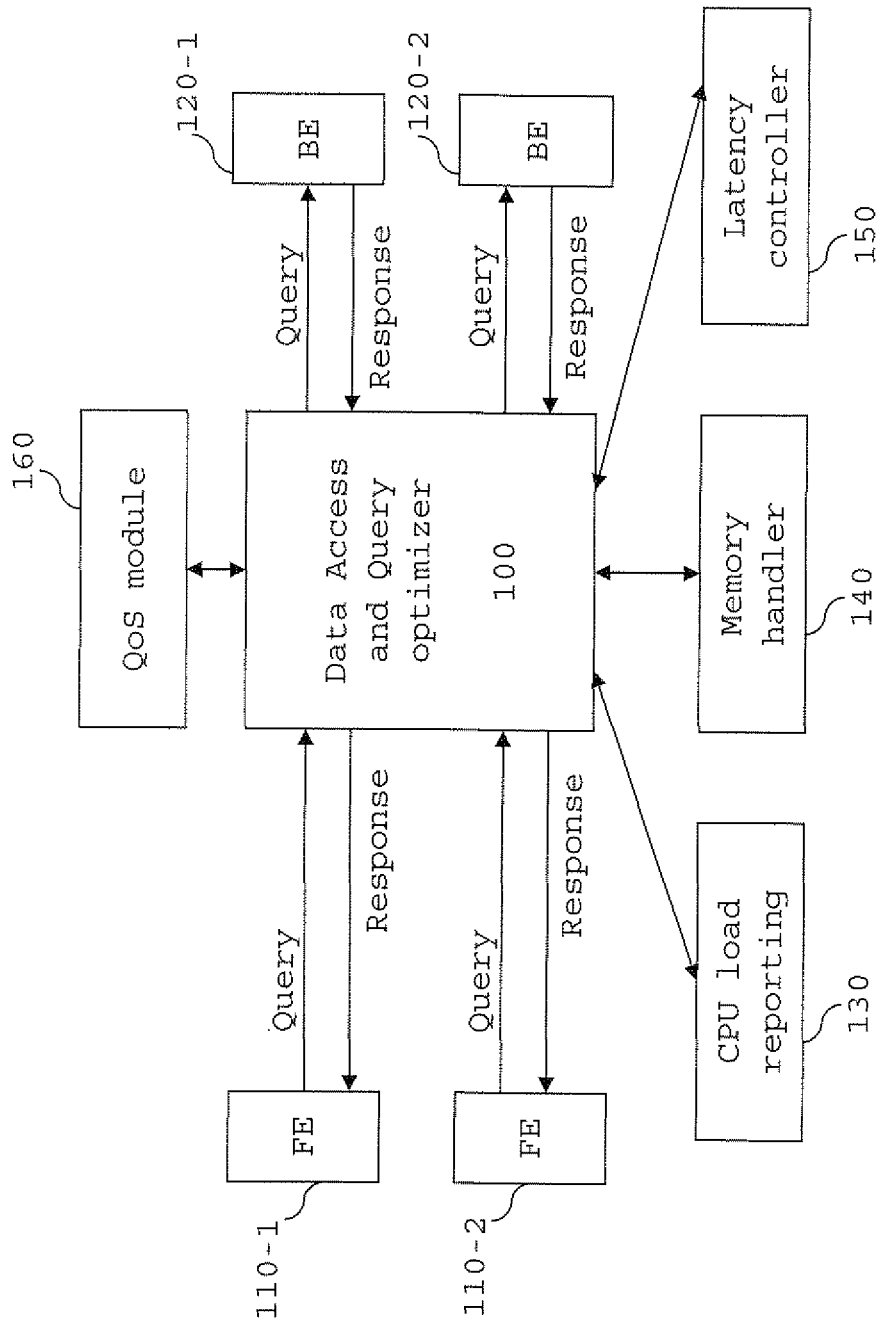
FIG. 1 shows a Data Access and Query Optimiser (DAQO) adapter and its operational connections to other functional modules according to an embodiment of the present invention.

FIG. 1 illustrates a Data Access and Query Optimiser (DAQO) adapter 100 in an embodiment of the present invention, together with other functional units with which it interacts. The DAQO adapter 100 is interposed between one or more database clients and one or more databases, and functions to convert or transform a query received from one or more of the database clients into a query plan for accessing one or more of the databases, as will be explained below.

In the present embodiment, the database clients 110-1 and 110-2 preferably take the form of DLA-compliant front-end (FE) database client applications. These applications may run on a common data processing apparatus, which may take any suitable or desirable form (e.g. a desktop computer or a server), or each on a separate such device. The front-ends 110-1 and 110-2 generate and send to the DAQO adapter 100 queries for back-end (BE) database systems 120-1 and 120-2, which may similarly be provided on a single data processing device (e.g. a database server) or on separate such devices. The hardware hosting the FE applications 110-1 and 110-2 may communicate with that hosting the BE database systems 120-1 and 120-2 by exchanging messages (including database queries and responses thereto) over any wired or wireless data connection or network (e.g. the Internet) known to those skilled in the art, using any suitable communication protocol (e.g. TCP/IP).

Figure 2:
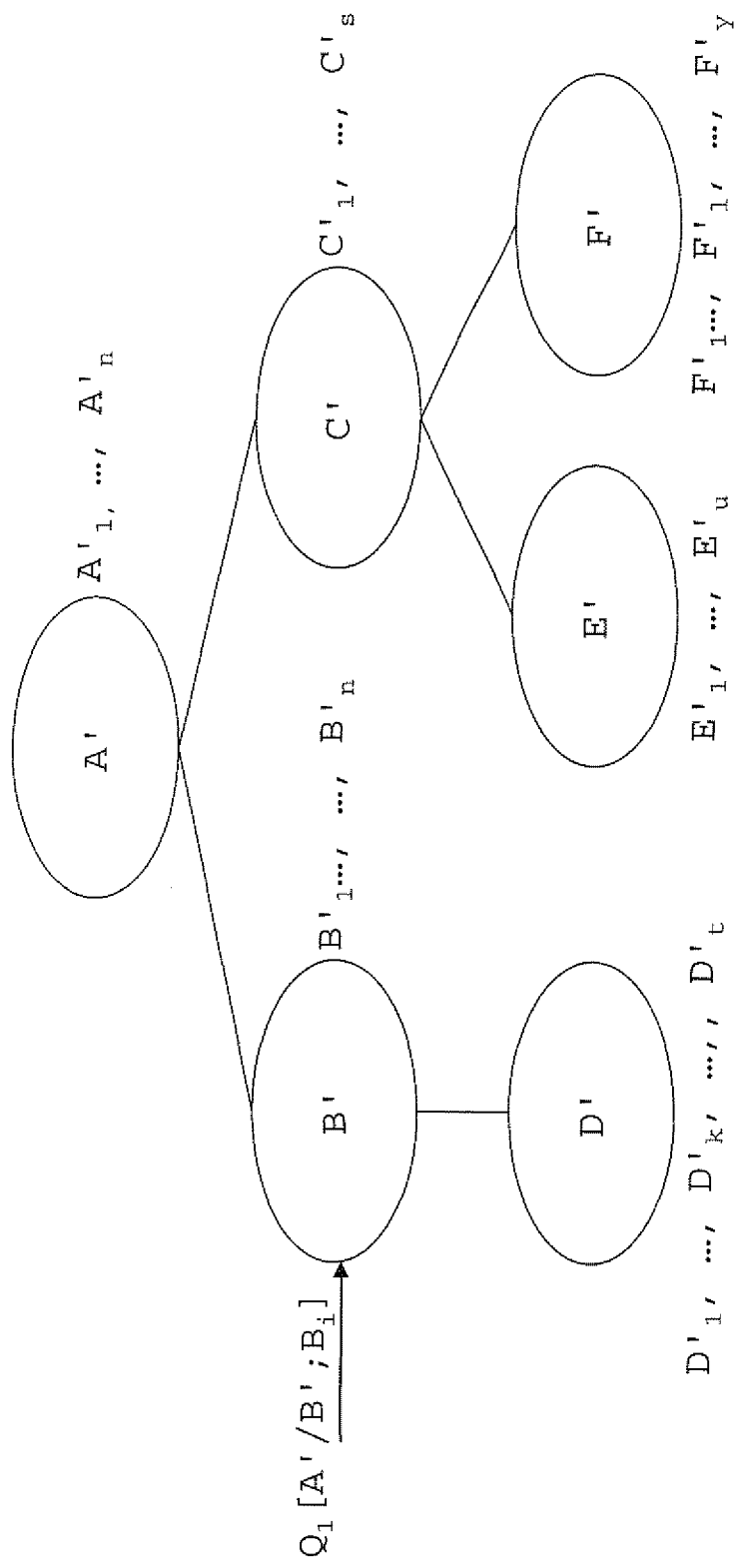
FIG. 2 illustrates a database data model used in the embodiment of the present invention.

The back-end database systems 120-1 and 120-2 each comprise a database and database management system (DBMS) which controls the creation, management and use of the database contents. In the present embodiment, each of the database systems 120-1 and 120-2 stores data which is logically arranged according a hierarchical data model that can be represented as a tree structure of logical nodes, for example as shown in FIG. 2. The contents of the database can be addressed by the clients 110-1 and 110-2 (e.g. for data search and modifications) by means of a protocol such as LDAP.

Each logical node in the data model illustrated in FIG. 2 is defined by its own identifier (A', B' . . . ) and a set of attributes ($A'_1, A'_2$ . . . ). The number of attributes per entry may vary. In the case that a database client has a data model that does not match that of the database system, each query issued by the client has to pass through a query reformulation process that reformulates every incoming query in terms of the database system's data model. However, in the present embodiment, the data models are exactly the same.

All of the queries issued by the database clients are expressed herein in pseudo code, to emphasise that the present invention is not limited to any particular query formalism or protocol. All the queries search for some data within the back-end system. In the present embodiment, only one attribute for a single entry is requested. In other words, the query can be expressed as Q(FE-Entry; Attribute), where "FE-Entry" specifies the complete path, from the root node, identifying the entry node, whereas "Attribute" represents the requested attribute. For example, the query written as $Q_1[A'/B';B_1]$ means search for attribute $B_1$ of the entry A'/B' within the database system's data model. However, more generally, any incoming FE query might request a set of attributes for a specified set of entries, rather than only one attribute for a single entry.

Figure 3:
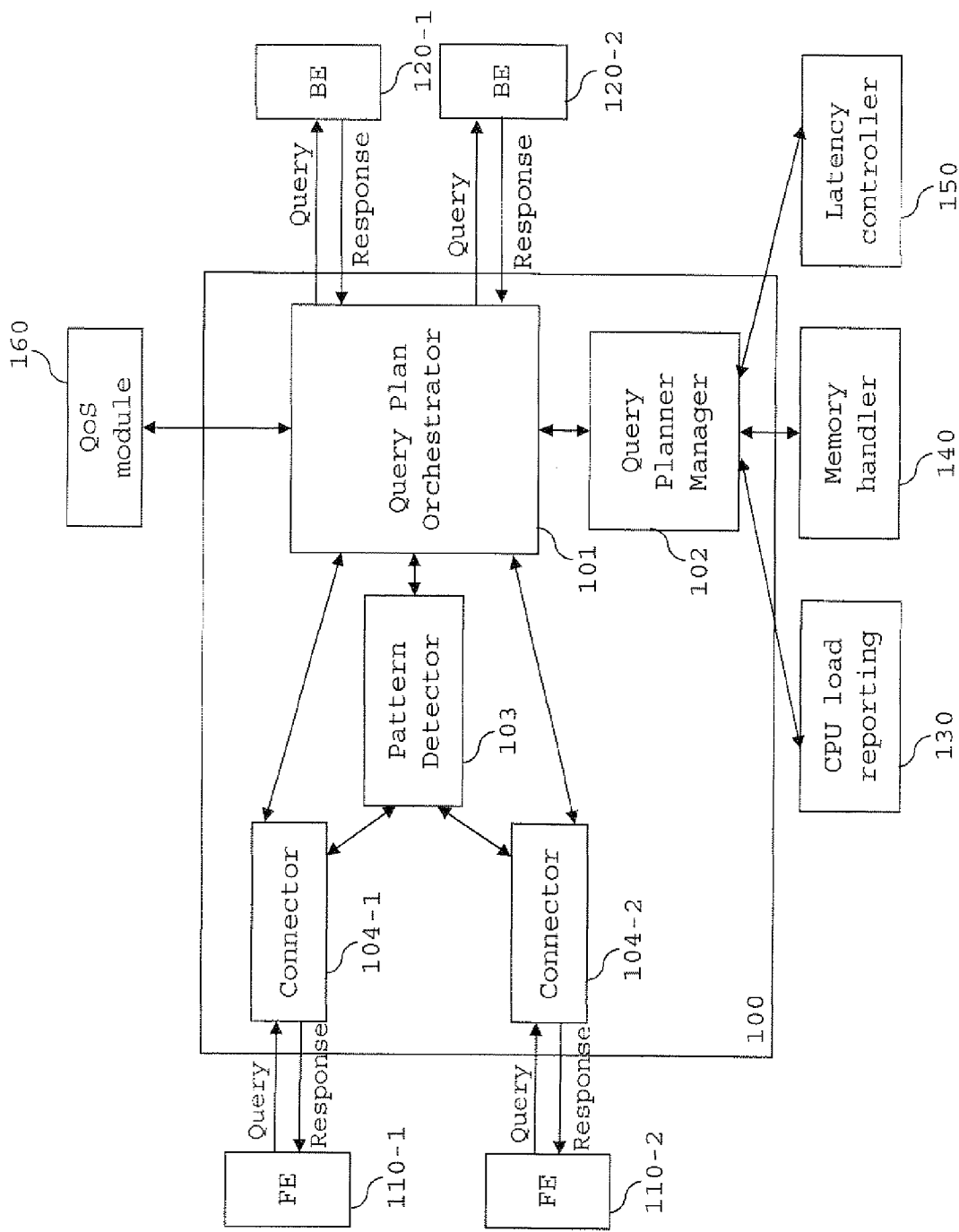
FIG. 3 shows details of the functional modules of the DAQO adapter shown in FIG. 1.

Referring again to FIG. 1, the DAQO adapter 100 of the present embodiment comprises a set of procedures that may form at least a part of a computer program, module, object or sequence of instructions executable by a programmable signal processing apparatus. The key functional components of the DAQO adapter 100, namely its query plan orchestrator (QPO) 101, query plan manager (QPM) 102, pattern detector 103 and the connector modules 104-1 and 104-2, are shown in FIG. 3. These procedures, when executed by the signal processing apparatus, generate a database-access query plan in a manner which will be described below.

Figure 4:
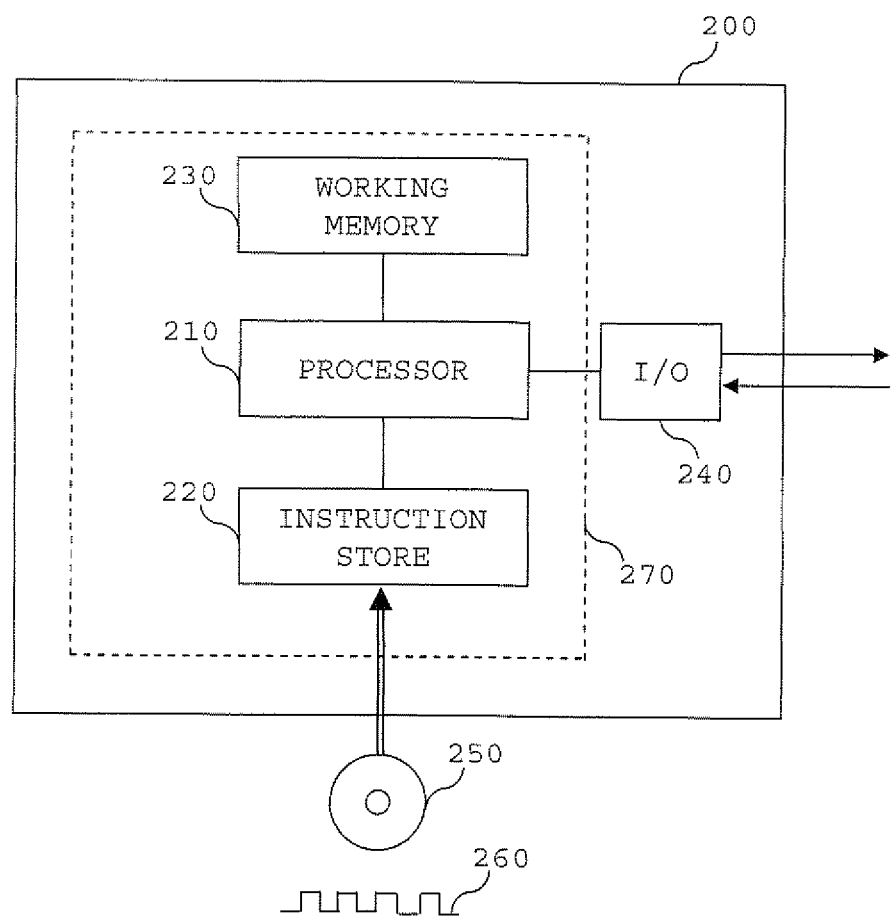
FIG. 4 illustrates a hardware implementation of the DAQO adapter according to an embodiment of the present invention.

The DAQO adapter 100 may be provided in a signal processing apparatus hosting one or more of the FE database clients 110-1 and 110-2, or in a signal processing apparatus hosting one or more of BE database systems 120-1 and 120-2. Alternatively, the DAQO adapter 100 may form part of a separate signal processing apparatus that is arranged to communicate with the hardware hosting the FE(s) or BE(s). In any of these cases, the functions of the DAQO adapter 100 may be performed by a programmable signal processing apparatus as shown in FIG. 4.

The signal processing apparatus 200 hosting the DAQO adapter 100 of the present embodiment comprises a processor 210, and an instruction store 220 storing computer-readable instructions which, when executed by the processor 210 cause the processor 210 to perform the processing operations hereinafter described to generate a query plan for accessing a database. The instruction store 220 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 220 may comprise a volatile memory (e.g. DRAM or SRAM), and the computer-readable instructions can be input thereto from a computer program product, such as a computer-readable storage medium 250 (e.g. an optical disc such as a CD-ROM, DVD-ROM etc.) or a computer-readable signal 260 carrying the computer-readable instructions.

The signal processing apparatus 200 further comprises a working memory 230 for storing received queries and query responses, as well as query patterns and other data used during operation, such as CPU load, latency, memory consumption and other Quality of Service (QoS) figures. The signal processing apparatus 200 also includes an input/output section or receiver/transmitter 240 for receiving queries from the database clients, outputting messages to the BE database systems 120-1 and 120-2 containing instructions for executing the generated query plan, and receiving query responses from the database systems. The transceiver 240 may also be operable to receive requested QoS figures from the database clients. As illustrated in FIG. 4, the receiver/transmitter 240 is arranged to communicate with the processor 210 so as to render the signal processing apparatus 200 capable of processing received messages (e.g. queries and responses) and transmitting the processing results to the FE(s) and BE(s), as appropriate.

In the present embodiment, the processor 210, instruction store 220 and working memory 230 together constitute a pattern detection unit 270, which can be regarded as a hardware implementation of the pattern detector 103 shown in FIG. 3. Similarly, the set of components 270 functions as both a query plan generator and a query plan execution unit, which are hardware implementations of the query plan manager 102 and the query plan orchestrator 101 shown in FIG. 3, respectively. The processor 210, instruction store 220 and working memory 230 also constitute a QoS determining unit 270 (which is an implementation of the QoS module 160). Furthermore, the components 210-230 of the signal processing apparatus 200 provide the functions not only of the DAQO adapter 100 and the QoS module 160, but also of the CPU load reporting module 130, memory handler 140 and the latency controller 150 shown in FIGS. 1 and 3.

As will be explained in the following, the apparatus 200 of the present embodiment modifies the way in which queries addressed to the back-end database systems(s) are processed, namely by generating query plans for executing one or more queries in a sequence that match a certain query pattern. This allows the response time for replying to subsequent queries issued by the database clients to be reduced.

However, before describing the processing operations performed by the DAQO adapter 100 to generate a query plan, it is helpful to first review some of the relevant concepts and terminology.

A "query pattern" may be regarded as a repeating sequence of a plurality of queries. In other words, a query pattern can be considered to be a set of ordered queries which repeats in a predictable manner. The expression "query pattern detection" "query pattern matching" refers to the process of checking for the presence of one or more queries that form part of a pattern. A query pattern can be based on, e.g., repetition and periodicity of certain queries. Formally, a query pattern QP can be defined, for example, as follows:

$$QP=\{q_1, q_2, \ldots q_N\}, \qquad (1)$$

where each $q_1$ is a query which is issued by a FE database client and received by a BE database system in a specific order, as indicated by the suffix i.

As mentioned above, query patterns are found to arise in many different database applications. For example, in the telecoms environment, FEs usually interface a signalling network (e.g. core IMS) which is thoroughly standardized, with a clearly-defined set of request/response messages sequences, which comprise Session Initiation Protocol (SIP) messages between Call Session Control Functions (CSCFs) and DIAMETER protocol messages between CSCFs and the Home Subscriber Server (HSS).

In particular, the functionality of the HSS (as well as the functionality of other nodes) might be implemented following DLA principles and, therefore, one or more FEs (i.e. HSS-FEs) could be arranged to be inter-operable with a back-end storage system that stores the user-related data that, according to the standardized procedures, are required by a HSS to accomplish its functionality.

Therefore, as the queries issued by the FEs (HSS-FEs) towards the BE(s) are normally triggered by network messages, which normally constitute some kind of ordered set of messages, these queries will also constitute an ordered set of queries with a predetermined structure, more specifically a query pattern as defined above. In some application scenarios (such as the example described below), the concrete query values will vary depending on the subscriber involved in each network transaction. In these cases, a query pattern can be determined by one or more queries comprising certain content, such as an identifier of the same subscriber.

Figure 5:
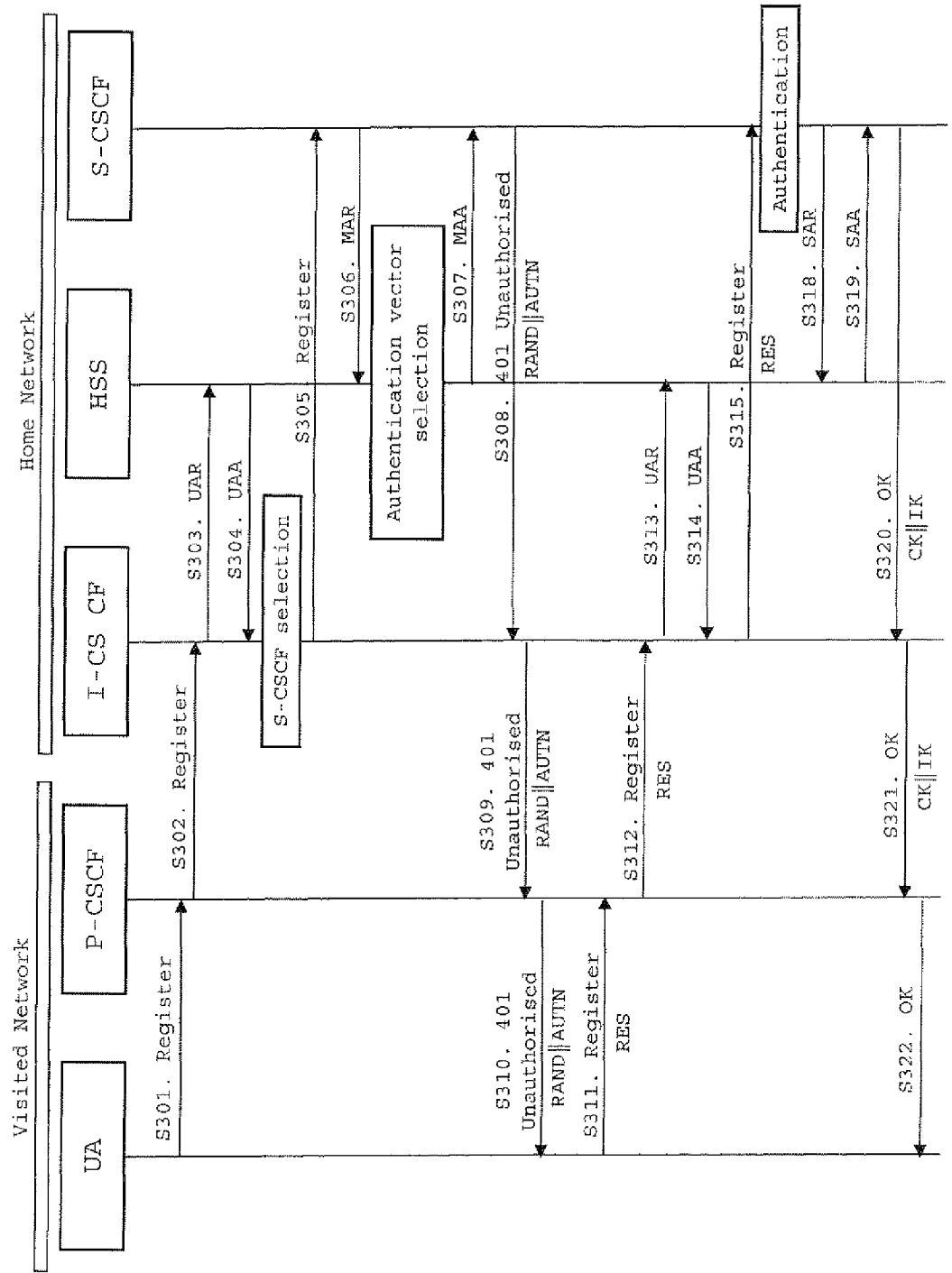
FIG. 5 shows the message flow of the registration of a user in the IP Multimedia Subsystem (IMS), which triggers a series of database queries.

An example which illustrates this point is IMS registration of a user in the IMS, which proceeds in accordance with the 3GPP specification TS 23.228. FIG. 5 shows the message flow during this registration procedure. The messages between CSCFs and HSS are illustrated as DIAMETER protocol messages, as specified in 3GPP specification TS 29.228. In the present example, these messages comprise one or more identifiers of the user concerned. Such user identifier(s) (or other identifier(s) related to the same user) are indicated in the corresponding queries sent from the HSS-FE(s) towards the BE(s) to obtain the necessary data related to said user.

In the present example, it is to be noticed that the HSS illustrated in FIG. 5 is not monolithic, but comprises one or more HSS-FEs adapted as front-end(s) according to DLA principles, which access(es) the data they(it) need(s) for their operation by querying a database system comprising one or more back-end (BE) data storages (not shown. in the figure for the sake of clarity). In this respect, it is to be noticed that DLA characteristics allow distributing a set of messages among a plurality of FEs of the same kind (e.g. HSS-FEs), even when the set of messages relate to the same event. For example, when the terminal of a user registers (or re-registers) into an INS system, a plurality messages relating to said specific event are to be sent towards a HSS for processing. In such a case, when a HSS server is adapted according to DLA, it is possible to distribute a first message related to the (re) registration of the user's terminal towards a first HSS-FE, and to distribute a subsequent related second message (i.e. belonging to the same re/registration sequence) towards a second HSS-FE. Accordingly, a number of queries sent from one or more FEs towards the BE(s) can constitute a sequence which, by using the techniques described below, can be determined as making up a query pattern that causes the selection and execution of the corresponding query plan.

Assuming that the user is in a so-called "unregistered" state, the registration flow will proceed as described below (where particular emphasis is put on the HSS tasks).

Step S301: After the User Equipment (UE) has obtained IP connectivity, it can perform the IM registration. To do so, the UE sends the Register information flow to the proxy (Public User Identity, Private User Identity, home network domain name, UE IP address).

Step S302: Upon receipt of the register information flow, the P-CSCF examines the "home domain name" to discover the entry point to the home network (i.e. the I-CSCF).

Step S303: The I-CSCF sends the UAR message to the HSS (Public User Identity, Private User Identity, P-CSCF network identifier). The HSS checks user data of the user concerned to determine whether the user is already registered. The HSS indicates whether the user is allowed to register in that P-CSCF network (identified by the P-CSCF network identifier) according to the User subscription and operator limitations/restrictions, if any.

Step S304: UAA is sent from the HSS to the I-CSCF. It contains the S-CSCF name, if it is known by the HSS, and the S-CSCF capabilities, if it is necessary to select a new S-CSCF. When the response contains both S-CSCF name and capabilities, the I-CSCF may perform a new assignment. When only capabilities are returned, the I-CSCF performs the new S-CSCF selection function based on the capabilities returned.

Step S305: The I-CSCF, using the name of the S-CSCF, determines the address of the S-CSCF through a name-address resolution mechanism. The registration request is sent forward to the S-CSCF. Steps S306-S307: The authentication process might take place. Depending on the chosen method (e.g. AKA, Digest), the sequence might differ. In any case, user credentials of the user concerned are obtained from HSS and a challenge/response mechanism is normally used.

Steps S308-S312: A second registration is initiated in order to validate user's credentials: the challenge is included in the outgoing message and the response is obtained through a second registration request.

Steps S313-S314: The same logic as for Steps S303 and S304 is executed although now there is a S-CSCF assigned (its identity is sent back to I-CSCE).

Step S315: The registration request is forwarded to the right S-CSCF.

S318-S319: The HSS stores the S-CSCF name for that user and returns the corresponding user information to the S-CSCF. The user information passed from the HSS to the S-CSCF includes one or more names/addresses information which can be used to access the platform(s) used for service control while the user is registered at this S-CSCF. The S-CSCF stores the information for the indicated user.

Step S320: The S-CSCF returns the 200 OK information flow (home network contact information) to the I-CSCF.

Step S321: The I-CSCF sends information flow 200 OK (home network contact information) to the P-CSCF.

Step S322: The P-CSCF stores the home network contact information, and sends information flow 200 OK to the UE.

Therefore; as a result of the registration flow, a predetermined set of DIAMETER messages (all tied to a specific user) will be processed in the HSS, namely:

M1: UAR/UAA
M2: MAR/MAA
M3: UAR/UAA
M4: SAR/SAA

Accordingly, each of these messages will trigger a set of queries (from the HSS-FE) towards the BE requesting the necessary user information of the user concerned in order to process the incoming DIAMETER message. The set of queries issued by HSS-FE towards the BE as a result of the execution of M1-M4 will constitute a query pattern. The query pattern can depend on the specific FE type (e.g. HSS, CSCF, MTAS) that issues the queries, as well as the FE vendor, since the data model handled by the FE is not necessarily standardised and is therefore dependent on the specific node implementation (the pattern assumes a specific data model).

In the IMS registration example described above, the reception of the first message (M1), UAR, in Step S303) can trigger a query from the HSS (FE) to obtain the necessary data for processing such a message. In an embodiment of the present invention, a processing apparatus 200 hosting the DAQO adapter 100, that is arranged between a plurality of FEs and one or more BE(s), can receive the query and generate (e.g. by selection) a query plan for executing one or more queries based on the query issued by the HSS-FE.

In this case, the processing apparatus may select a query plan, which makes it execute before the corresponding BE(s) one or more queries (as set out in the query plan) for obtaining all the data that would be needed by the HSS-FE for processing the (foreseeable) subsequent messages M2 to M4, and which will allow the apparatus hosting the DAQO adapter to reply faster to the (foreseeable) subsequent queries of the HSS-FE, since it would have pre-fetched the corresponding data in advance. The number of queries which the DAQO issues to the BE (s) in accordance with the query plan is preferably smaller than the total number of queries in the (corresponding) detected query pattern. For example, if a foreseen first query will request data "D1" and a further subsequent foreseen query will request data "D2", the DAQO may generate a query plan comprising a procedure for executing a single new query before the BE(s) to answer both of the aforementioned queries that request data "D1" and "D2".

Therefore, the DAQO adapter is able to obtain in advance data that can be needed by a database client, such as a HSS-FE, to process a certain subsequent message (e.g. any of M2 to M4) upon reception of a certain query (e.g. the query triggered by the reception of M1—Step S303—in the HSS-FE). In this way, the speed of the query processing service is improved from the point of view of the database clients.

A plurality of query patterns may be provided in the DAQO adapter 100 by a user (e.g. by appropriate programming of the adapter), or they may be detected automatically by the pattern detection unit 103 of the DAQO adapter 100 from a series of queries which have been received from one or more of the database clients 110-1 and 110-2. For example, the following set of queries may be issued by one or more database clients 110-1 and 110-2 and arrive to the DAQO adapter 100:

$Q_1(A', Q_2[A'/B',B_1], Q_3[A'/B',B_2], Q_4[A'/B', B_3], Q_5[A'/C', C_1], Q_6[A'/C'/E', E_1], Q_7[A', A_1], Q_8[A'/B',B_1], Q_9[A'/B', B_2], Q_{10}[A'/B',B_3], Q_{11}[A'/C',C_1], \ldots$ etc.

In the sequence above, the index "i" in the query $Q_1$ indicates the order in which the query arrives at the DAQO. The pattern detection unit 270 of the apparatus 200 may automatically detect that queries $Q_1$ to $Q_5$ are repeated later in the received sequence and thus identify the sequence of queries in the form $Q[A',A_1], Q[A'/B',B_1], Q[A'/B', B_2], Q[A'/B',B_3], Q[A'/C',C_1]$ as belonging to a query pattern. Regardless of whether the query patterns are detected automatically or input manually, they are stored in the working memory 230 of the signal processing apparatus 200.

The processes performed by the DAQO adapter 100 to generate a query plan will now be described with reference to FIGS. 6 to 8.

Figure 6:
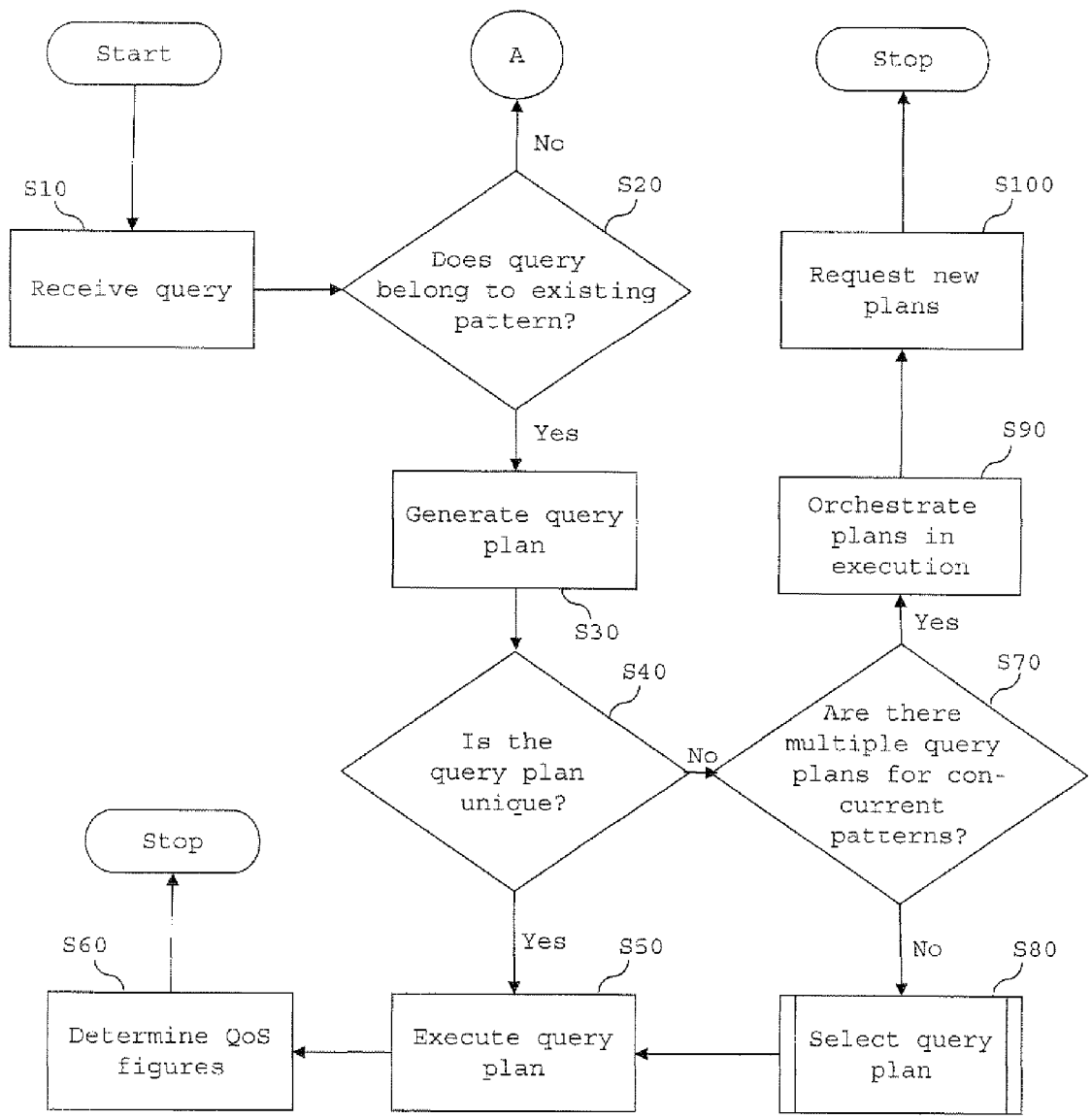
FIGS. 6, 7 and 8 are flow charts illustrating a process of generating a query plan according to an embodiment of the present invention.

Referring first to FIG. 6, in step S10, the DAQO adapter receives a query from one of the FE database clients 110-1 and 110-2 via the I/O section 240 and a corresponding connector, 104-1 or 104-2, of the DAQO 100.

At this stage of the processing, the QoS determining unit 270 (e.g., the QoS module 160)of the DAQO may also determine a Quality of Service (QoS) measure for use in selecting a query plan. For example, in step S10, the QoS determining unit 270 of the DAQO may determine a QoS measure dynamically by receiving from the client an indication of the QoS required for a Query or all the queries within the current communications session (in terms of throughput, latency, CPU and/or memory consumption, for example). In this case and if for example, LDAP is the protocol used by the client to communicate with the database (and/or the DAQO), it is preferable that the LDAP session-establishing message "BIND" sent from the client towards the database (which precedes any query in said session) conveys a QoS requested figure that should be applicable for processing all of the messages within the session.

Alternatively, instead of receiving from the client an indication of the QoS required for a query or all the queries within a session, the QoS measure may be determined in advance and pre-stored in memory 220 or 230 of the signal processing apparatus. In this case, the QoS determining unit 270 determines the QoS measure by retrieving and reading the stored QoS measure. Such pre-stored QoS measures may be established on a per-database client basis (e.g. for a specific HSS-FE), or set for each database client type (e.g. for all HSS-FEs). In the latter case, the database client type may be determined on the basis of one or more client identifiers that have been included in a message sent from the client towards the BF system.

In step S20, the pattern detection unit 103 determines whether the received query belongs to one of the stored query patterns, for example by determining whether the received query is the same as a query which appears in one of the stored sequences forming a stored query pattern. Such a comparison of a single received query with the stored query patterns may be sufficient to identify the received query (and the subsequently received queries) as belonging to a stored query pattern if the received query is uniquely associated with one of the stored patterns.

However, the received query may be found to match a query present in more than one stored query pattern. In this case, the pattern detector 103 of the DAQO may select one of the matching patterns on the basis of probability factors or statistics which are stored in the memory 230 in association with each of the patterns, wherein each factor or statistic provides a measure of the likelihood that the associated pattern will occur in a received set of queries. For example, pattern detector 103 may select the query pattern having the highest probability factor. The likelihood of various patterns occurring may be assessed by monitoring the traffic rate for each query pattern and storing the results (the time window used for this calculation can be configurable).

Alternatively, the DAQO may receive more than one query from one or more of the FEs in step S10, and determine in step S20 whether the received queries form (or are likely to form) a part of a stored query pattern by determining whether the received queries match a part any given stored query pattern. If a comparison of the received queries with at least some of the queries of a single stored query pattern reveals a match, the matching query pattern is selected. If the comparison reveals a match with more than one stored query pattern, the selection may make use of a probability factor or statistic, as described above. Once the received one or more queries have been determined in step S20 to form a part of a particular query pattern comprising a repeating sequence of a plurality of queries, both the received query and the query pattern are conveyed to the query plan orchestrator 101 and the query plan manager 102.

In step S30, the query plan orchestrator 101 instructs the query plan manager 102 to generate a query plan, which is for executing one or more queries in the sequence that match the received one or more queries, and for executing a query that is subsequent to the matching one or more queries in the sequence.

The query plan manager 102 may generate the query plan by retrieving a pre-compiled query plan which is stored in association with the identified query pattern in the memory 230. Alternatively, the QPM 102 may generate the query plan by calculating it using techniques that are adapted from those used in query plan formulation in DBMSs. In either case, the query plan will comprise one or more procedures (hereinafter also referred to as "actions"), each being a set of data manipulation steps (e.g. in terms of data obtainment and/or data modification) for executing a query, to thereby provide the data necessary to solve one or more queries of a pattern. In other words, an action is equivalent to the execution of one or more queries from those belonging to a pattern. Each action preferably optimizes (i.e. in time, in memory consumption, etc) the execution of its associated query/queries.

For example, in the context of the data structure illustrated in FIG. 2, the query plan for the sequence of queries $Q_1[A', A_1], Q_2[A'/B', B_1], Q_3[A'/B', B_2], Q_4[A'/B', B_3], Q_5[A'/C', C_1]$ in a query pattern might comprise the actions $a_1$ to $a_5$, as follows:

Plan $P_1$: $a_1[A', A_1]$, $a_2[A'/B', B_1]$, $a_3[A'/B', B_2]$, $a_4[A'/B', B_3]$, $a_5[A'/C', C_1]$ Thus, for example, action $a_1$ may be executed to access (and retrieve or modify) attribute $A_1$ located at logical node A'.

However, it is preferable, as in the present embodiment, for the query plan manager 102 to optimise the query plan so as to minimise resource consumption (e.g. memory or processor resources) and generate a query plan having fewer actions than there are queries in the corresponding query pattern. For example, for the sequence of queries $Q_1[A', A_1], Q_2[A'/B', B_1], Q_3[A'/B', B_2], Q_4[A'/B', B_3], Q_5[A'/C', C_1]$, a better query plan might be:

Plan $P_2$: $a_1[A', A_1]$, $a_2[A'/B', (B_1 B_2, B_3)]$, $a_3[A'/C', C_1]$

Use of the preferred Plan $P_2$ allows some or all of the queries in the query sequence Q1-Q5 to be processed (and thus attributes $A_1$ and $B_1$-$B_3$, or $A_1$, $B_1$-$B_3$ and $C_1$, to be accessed and operated on) with fewer actions than would be needed using plan $P_1$. Thus, for example, the retrieval or modification of attributes $B_1$, $B_2$ and $B_3$ stored at node A'/B' would require the execution of a single action $a_2$, and a corresponding single access to that node.

The QPM module 102 may also implement a query reformulation algorithm based on data model mappings, if necessary. An example of this functionality (based on XML) is described in "Reformulating XPath queries and XSLT queries on XSLT views" by Groppe S. et al., Data Knowledge Engineering 57 (2006), Pp. 64-110.

Furthermore, QPM 102 may be able to propose more than one query plan to the QPO 101 in step S30. The QPO 101 therefore checks in step S40 whether only one query plan has been proposed for the identified query pattern and, if so, proceeds in step S50 to execute at least a part of the query plan provided by the QPM 102.

In step S50, the QPO 101 may execute action $a_1$ of Plan $P_2$ first and send the results back to the FE that sent the query, if it is uncertain whether the first query received by the DAQO 100, namely $Q_1$, belongs to a particular query pattern. Two situations may then arise:

1) If the next query that the DAQO 100 receives is in fact $Q_2$, the QPO 101 of the DAQO can trigger the execution of action $a_2$, or even both of actions $a_2$ and $a_3$. This requires the DAQO to retrieve data relating to $B_1$, $B_2$, and $B_3$ (or even $B_1$, $B_2$, $B_3$ and $C_1$) from the corresponding BE(s) database(s) and store the obtained data in a memory cache, for example held locally, or accessible, by the DAQO 100. In this way, the DAQO 100 will be able to use the memory cache to resolve subsequent queries (e.g. $Q_2$ to $Q_4$, or $Q_2$ to $Q_5$) directly, without needing to send further queries to the BE database(s). In the present embodiment, the memory cache 230 stores data items relating to $B_1$, $B_2$, and $B_3$, as obtained by action $a_2$.

2) In other cases (e.g. if query $Q_1$ is not followed by query $Q_2$), the DAQO 100 might discard the execution of further actions, such that only action $a_1[A', A_1]$ is executed.

On the other hand, if the pattern detector 103 identifies with high confidence that $Q_1$ forms part of a particular pattern which has plan $P_2$ as the associated query plan, the QPO 101 preferably executes the whole of plan $P_2$ (i.e. actions $a_1$, $a_2$ and $a_3$), stores the results of the execution in the data store 230, and forwards the stored data to the FE which sent the query.

Thus, it will be appreciated that the processing of received queries using query patterns, and an optimisation of actions executing the queries of a detected pattern, not only allows the number of queries executed against the BE database(s) to be reduced from five (comprising $Q_1$ to $Q_5$) to only three (which corresponds to the number of actions that constitute the selected plan) in the present example, but also allows the DAQO to predict and obtain answers for queries even before some of them have been received from the database client. Accordingly, the query processing is optimized from the point of view of the database clients (e.g. the FEs of a DLA-compliant architecture).

Every query plan may have the CPU, latency and memory cost associated with its execution stored in a data table that is provided in the memory 230. The values of these variables can be established from a single execution of the plan (or can even be inferred based on past executions). With regard to latency, it is assumed that the delays due to the database roundtrip should not significantly change from one plan to another; that is, the latency introduced by using an external communication network so as to access a BE database from a database client (e.g. from a FE, or from the DAQO) is expected to be much larger that the one introduced by the DAQO in order to answer a query using its own data (e.g. previously obtained and internally stored). Where this is not the case, it would be possible to store this information in a similar way as it is done for the CPU and memory.

In step S60, the CPU load reporting module 130, the memory handler 140 and the latency controller 150 communicate with the DBMS via the I/O section 240 to collect values of the CPU load, latency, memory consumption and other QoS figures relating to the query execution, and provide these values to the QoS module 160. The QoS module 160 then updates the values of the QoS figures stored in the working memory 230 in association with the query plan which has been executed. The operation of the DAQO adapter 100 then stops, and may resume when another query is submitted to it by one of the database clients.

If, on the other hand, it is determined in step S40 that the query plan proposed by the QPM 102 is not unique, the process proceeds to step S70, where the QUO 101 determines if there are multiple query plans for concurrent patterns issued by two or more FEs. If this is the case, in step S90, the QPO 101 orchestrates all the plans in execution in order to satisfy the different QoS figures, before requesting in step S100 new plans for those in execution that do not achieve the requested QoS. The operation of the DAQO adapter 100 then stops, and may resume when another query is submitted to it by one of the database clients.

However, if it is not determined in step S70 that there are multiple query plans for concurrent patterns issued by two or more FEs, the QPO 101 proceeds to dynamically select a query plan from the possible stored query plans in step S80. An example of how this may be done is shown in FIG. 7, which shows the details of step S80 in FIG. 6.

Figure 7:
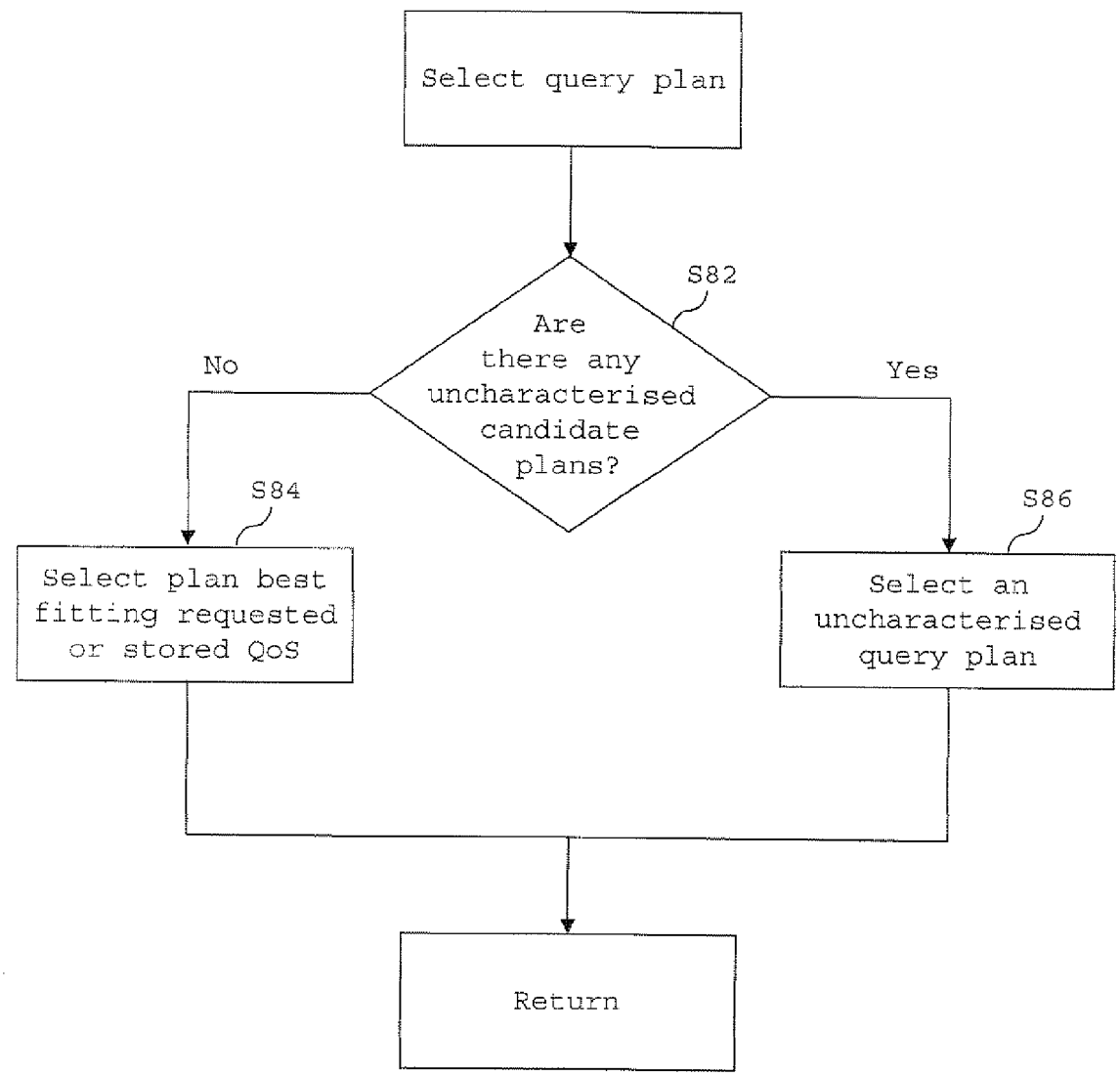

With reference to FIG. 7, in step 582, the QPO 101 determines whether any of the stored candidate query plans have not yet been characterised in terms of a QoS figure which relates to the same QoS type (e.g. throughput, latency, CPU or memory consumption) as the QoS indication received from the database client in step S10 or, as the case may be, the QoS measure which is pre-stored in the DAQO memory 230.

If all of the prospective plans have already been characterised in this way, the QPO 101 selects one of these query plans for execution. This selection may be performed by comparing the received/pre-stored QoS measure with the corresponding QoS figure for each query plan that is stored in association with the matching query pattern, and making the selection based on the result of the comparison. More specifically, the QPO 101 may make the selection by using automated planning techniques to estimate which plan best fits the corresponding QoS demanded by, or deemed appropriate for, the FE. Alternatively, the QPO may use automated planning techniques to minimize the resource consumption (e.g. memory and/or processor resources). Accordingly, provided that there are several suitable plans, the QPO 101 tries to assess the optimal one fitting the received/pre-stored QoS requirements. This means that the selected plan preferably does not affect the QoS secured to other query patterns tied to other FEs. Thus, in addition to providing the advantages in terms of reduced latency as discussed above, the DAQO is able to cater for the needs of database clients which may have very different QoS requirements.

However, it may be the case that not all of the possible query plans (i.e. those associated with the query pattern which the received one or more queries are determined to form a part of) have already been characterised in terms of the relevant QoS figure. Under these circumstances, the QPO 101 may select such an uncharacterised query plan in step S86, for example by selecting from other such plans in a predetermined order, or at random.

Once all of the query plans associated with a query pattern have been appropriately characterised in response to past queries, the QPO 101 may choose an appropriate query plan in accordance with step S84. If all of the relevant QoS figures are stored in the DAQO, the QPO 101 preferably performs step S84 to select the query plan with the best matching QoS figure(s), the selection preferably being performed with a high probability, for example 0.8, 0.9 or 0.95. In this case, the QPO 101 may alternatively select one of the remaining candidate query plans, this selection being performed with a low probability (e.g. 0.05 or 0.02 or 0.01). By performing the selection in this way, the QPO 101 is able to keep the QoS figures stored by the DAQO in association with the respective query plans up-to-date, whilst reliably servicing the queries from the database clients.

Once a query plan has been selected in step S84 or S86, the process proceeds to step S50 in FIG. 6, where at least a part of the selected query plan is executed, and subsequently to step S60.

From the above description, it will be appreciated that the DAQO adapter 100 of the present embodiment is able to associate—dynamically—to each incoming FE query pattern the corresponding query plan that better fits the concrete FE QoS demands (it should be noted that since there might be several FEs using the DAQO adaptor, the optimum query plan will generally depend on the concrete query plans being executed at a given time).

Figure 8:
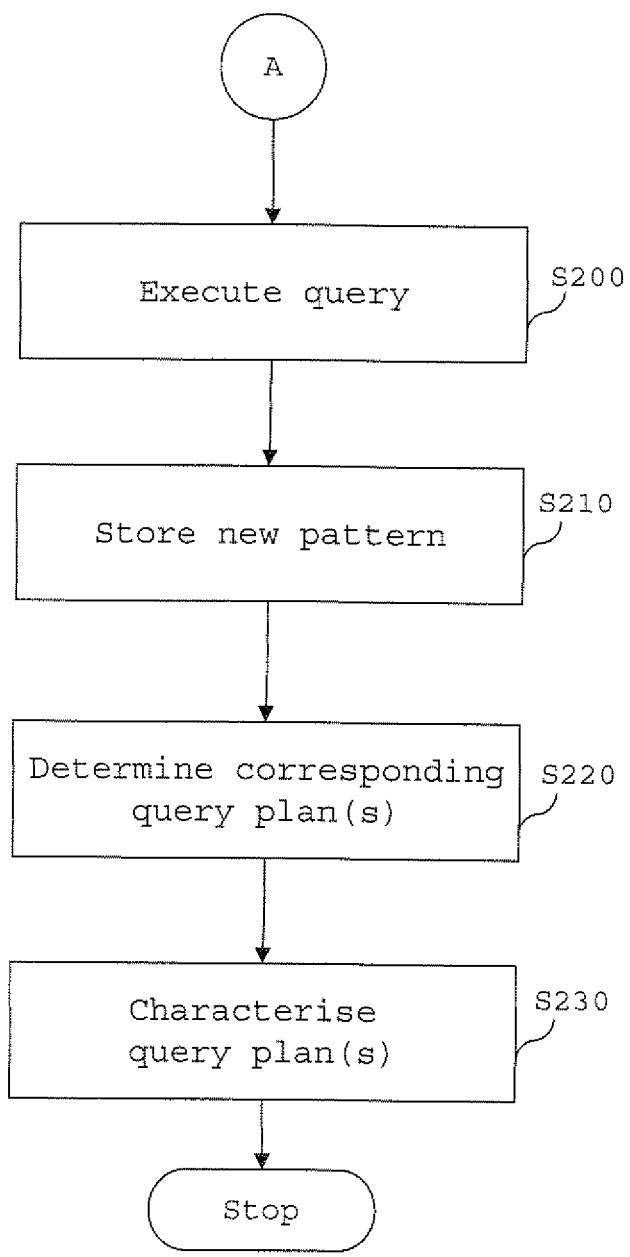

If in step S20 it is determined that the received query does not form a part of a stored query pattern, then, as shown in FIG. 8, the QPO 101 preferably executes the query in step S200 and stores the results of the execution into the working memory 230 . In step S210, the QPO initiates the creation of a new query pattern which includes the received query. The DAQO 100 then receives a number of subsequent queries from the database client(s), and attempts to find a pattern in the received sequence of queries. If such a pattern is found, it is stored in the memory 230, by the DAQO.

In step S220, the QPO generates one or more query plans for the new query pattern, and executes the plans. Once the plans have been executed, the corresponding QoS figures are determined in step S230.

The optimal query plan can be obtained using Automated Planning techniques: generally speaking, a plan is composed by several actions, as noted above. An action within a plan could be the same input query (in the case that the execution of that query fits the QoS requirements) or a new query that involves different values (e.g., a search in LDAP that is performed with a different relative distinguish name, or with different scope, etc).

When an action is executed and it corresponds to the same query as the one in the input, the DAQO adapter 100 collects the QoS figures associated to that query and updates the corresponding values into the memory 230 storing the query pattern. These values can be used to generate future query plans in a more accurate way.

When an action is executed and it corresponds to a different query than the one sent by the FE, the results of the action will be stored into a results record that is kept in the memory 230.

These results will cover the necessary to answer the input query and to answer the next queries that are supposed to come according to the detected query pattern.

In order to avoid inconsistencies (the data stored in memory can be modified by another query in the mean time) two alternative measures may be taken:

1) The memory may be cleared whenever a write operation conflicting with a pattern execution is detected.

2) The data values based on the notifications sent from the BE (in case the BE supports this option) may be updated.

As will be appreciated from the above description, the present embodiment reduces the time spent in a query reformulation process by dealing with sequences of patterns instead of performing the reformulation for each query each time. In addition, it reduces the latency caused by executing several queries to the BE by storing the results of a query plan into a memory, and thus it also reduces the time spent on executing queries, capturing its results, and transforming then into a format understandable by the FE. And finally, it allows managing the level of QoS required by each FE when they issue queries concurrently.

[Modifications and Variations]

Many modifications and variations can be made to the embodiments described above.

For example, in the embodiment described above the query plan generator, pattern detection unit and the query plan execution unit and the quality of service determining unit are each provided in the form of a programmable processing apparatus 200 having a processor 210 which provides the respective functions of these components of the query plan generating apparatus by executing software instructions stored in instructions store 220. However, it will be appreciated that the aforementioned components may be implemented in different hardware. For example, the apparatus operable to generate a query plan may comprise non-programmable hardware having one or more modules that are dedicated to performing the operations which have been described above.

Furthermore, although the data model and the data access protocol (e.g., LDAP or SQL) employed by the FEs 110-1 and 110-2 and the BEs 120-1 and 120-2 in the above embodiment are the same, this will not always be the case, particularly where the FEs and BEs have been supplied by different vendors. Under these circumstances, a query reformulation module (QRM), which may be implemented on the same or a different hardware platform as the DAQO adapter, may be employed to ensure the inter-operability of the database systems and their clients.

Figure 9:
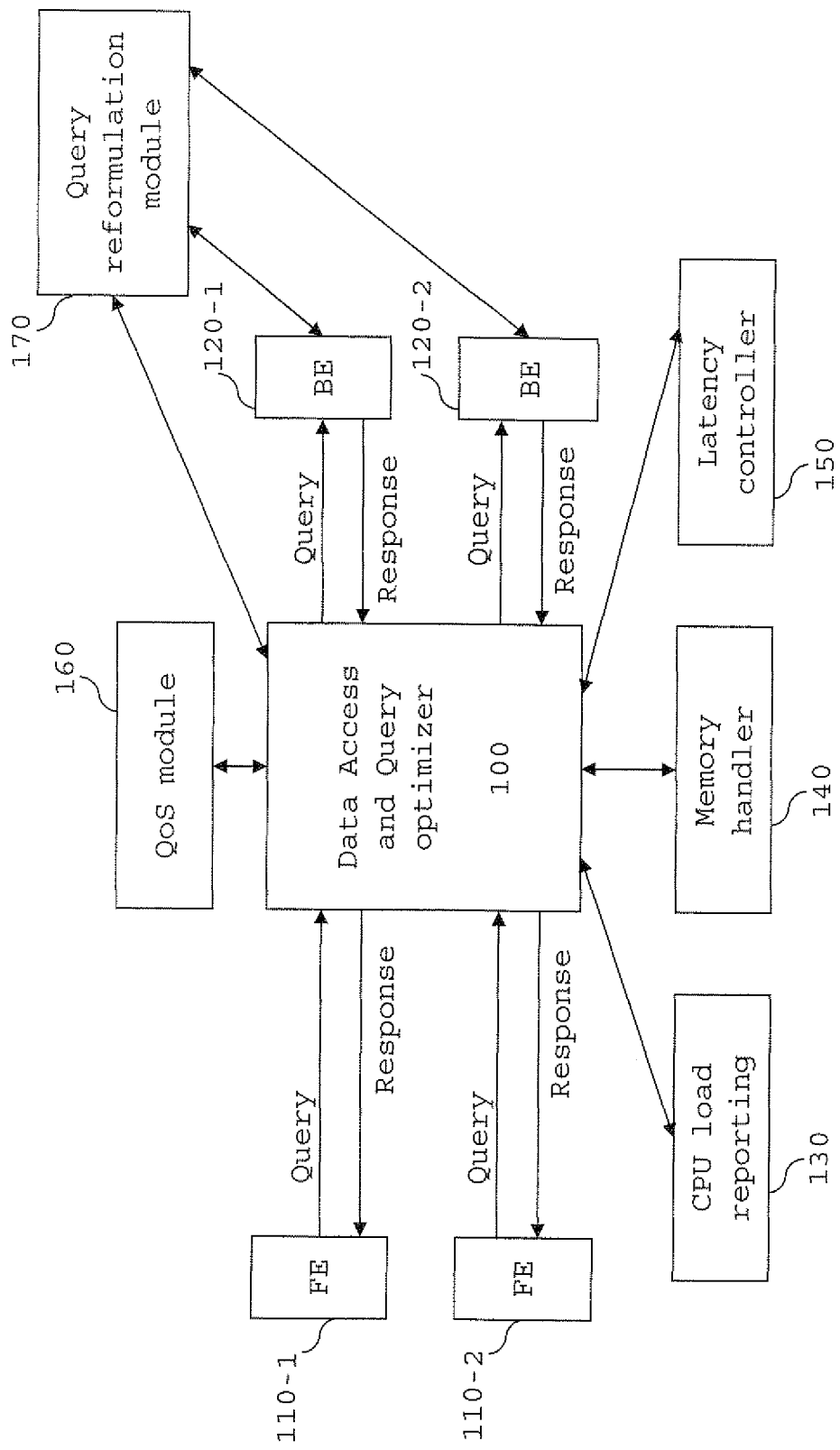
FIG. 9 shows a modified embodiment in which a query reformulation module is connected to the DAQO adapter and the other functional modules shown in FIG. 1.

Such a QRM may be operationally connected to the DAQO adapter 100 and to the BEs 120-1 and 120-2 as shown in FIG. 9. The QRM 170 functions to reformulate a query issued by a FE in terms of the BE data model and/or data access protocol. The QRM also functions to reformulates a reply from a BE to such a query in terms of the FE data model and/or data access protocol. In an alterative arrangement, the QRM 170 may be operationally connected between the DAQO 100 and one or more of the FEs 110-1 and 110-2.

The invention claimed is:

1. A method of operating a data access and query optimizer (DAQO) circuitry configured to generate a query plan for accessing a database, the method comprising:
   receiving, at the DAQO circuitry, at least two electronic queries from a database client;
   determining, by the DAQO circuitry, whether the received at least two queries form a part of a set of ordered queries comprising a repeating sequence of a plurality of queries, by determining whether the received at least two queries match a part of the sequence of queries;
   determining, by the DAQO circuitry, a Quality of Service measure specifying a Quality of Service that the database client requires to be achieved during execution of the at least two electronic queries;
   when the received at least two queries are determined to form the part of the set of ordered queries, selecting, by the DAQO circuitry, a query plan for executing queries in the sequence that match the received at least two queries and a query that is subsequent to the matched queries in the sequence; and
   executing, by the DAQO circuitry, the query that is subsequent to the matched queries in the sequence prior to receiving that query from the database client,
   wherein the query plan is selected from a plurality of stored query plans associated with the received at least two queries,
   wherein the process of selecting the query plan comprises:
       comparing, by the DAQO circuitry, the determined Quality of Service measure with a respective Quality of Service figure associated with each of the plurality of stored query plans; and
       selecting, by the DAQO circuitry, the query plan from among the plurality of stored query plans whose Quality of Service figure best matches the determined Quality of Service measure based on results of the comparison, and
   wherein the DAQO circuitry is implemented in hardware or in a combination of hardware and software.

2. A method according to claim 1, wherein the query plan comprises one or more procedures for executing queries to answer the queries in the sequence, the number of queries to be executed by the one or more procedures in the query plan being smaller than the number of queries in the sequence.

3. A method according to claim 1,
   wherein determining the Quality of Service measure comprises retrieving a stored Quality of Service measure, and
   wherein the process of selecting the query plan comprises comparing the retrieved Quality of Service measure with a respective Quality of Service figure associated with each of the plurality of query plans and selecting the query plan from among the plurality of stored query plans based on results of the comparison.

4. A method according to claim 1,
   wherein the Quality of Service measure is determined by receiving from the database client an indication of a Quality of Service required thereby, and
   wherein the process of selecting the query plan comprises comparing the received indication of the required Quality of Service with a respective Quality of Service figure associated with each of the plurality of query plans and selecting the query plan from among the plurality of stored query plans based on results of the comparison.

5. A method according to claim 1, further comprising:
   executing at least a part of the selected query plan;
   determining, by the DAQO circuitry, at least one Quality of Service figure associated with the execution; and
   storing, by the DAQO circuitry, a Quality of Service figure for the selected query plan in accordance with the determined Quality of Service figure associated with the execution.

6. An apparatus configured to generate a query plan for accessing a database, the apparatus comprising:
   receiver configured to receive at least two electronic queries from a database client;
   Quality of Service determining circuitry configured to determine a Quality of Service measure specifying a Quality of Service that the database client requires to be achieved during execution of the at least two electronic queries;
   pattern detection circuitry configured to determine whether the received at least two queries form a part of a set of ordered queries comprising a repeating sequence of a plurality of queries by determining whether the received at least two queries match a part of the sequence of queries;
   query plan generator circuitry configured to select a query plan for executing queries in the sequence that match the received at least two queries and a query that is subsequent to the matched queries in the sequence; and
   query plan execution circuitry configured to execute the query that is subsequent to the matched queries in the sequence prior to receiving that query from the database client,
   wherein the query plan generator circuitry is configured to select the query plan from a plurality of stored query plans associated with the received at least two queries by comparing the determined Quality of Service measure with a respective Quality of Service figure associated with each of the plurality of query plans, and selecting the query plan from among the plurality of stored query plans whose Quality of Service figure best matches the determined Quality of Service measure based on results of the comparison, and wherein the receiver, the Quality of Service determining circuitry, and the pattern detection circuitry is implemented in hardware or in a combination of hardware and software such that the apparatus as a whole is implemented in hardware or in a combination of hardware and software.

7. An apparatus according to claim 6, wherein the query plan generator circuitry is configured to generate a query plan comprising one or more procedures for executing queries to answer the queries in the sequence, the number of queries to be executed by the one or more procedures in the query plan being smaller than the number of queries in the sequence.

8. An apparatus according to claim 6,
wherein the Quality of Service determining circuitry is configured to determine the Quality of Service measure by retrieving a stored value of the Quality of Service measure, and wherein the query plan generator circuitry is configured to select the query plan from the plurality of stored query plans associated with the received at least two queries by comparing the retrieved Quality of Service measure with a respective Quality of Service figure associated with each of the plurality of query plans and selecting the query plan from among the plurality of stored query plans based on results of the comparison.

9. An apparatus according to claim 6,
wherein the Quality of Service determining circuitry is configured to determine the Quality of Service measure by receiving from the database client an indication of a Quality of Service required thereby, and wherein the query plan generator circuitry is configured to select the query plan from the plurality of stored query plans associated with the received at least two queries by comparing the received indication of the required Quality of Service with a respective Quality of Service figure associated with each of the plurality of query plans and selecting the query plan from among the plurality of stored query plans based on results of the comparison.

10. An apparatus according to claim 6,
wherein the query plan execution circuitry configured to execute at least a part of the selected query plan, wherein the Quality of Service determining circuitry is further configured to determine at least one Quality of Service figure associated with the execution, and store a Quality of Service figure for the selected query plan in accordance with the determined Quality of Service figure associated with the execution.

11. A non-transitory, computer-readable storage medium storing computer program instructions which, when executed by a processor, cause the processor to perform a method as set out in claim 1.

12. A data access and query optimizer (DAQO) apparatus, comprising:
a connector configured to receive a query set from a database client, the received query set comprising at least two received queries addressed to a database management system (DBMS);

pattern detector circuitry configured to
determine whether the received query set belongs to one or more existing query patterns stored in a storage, each existing query pattern comprising plural queries in a specific order corresponding to that existing query pattern, and when it is determined that the received query set does belong to the existing quality pattern(s), select one of the existing query pattern(s) to which the received query set belongs as a selected query pattern;

Quality of Service (QoS) circuitry configured to determine a QoS measure specifying a Quality of Service that the database client requires to be achieved during execution of the received query set;

query plan manager circuitry configured to generate a query plan based on the selected query pattern, the generated query plan comprising at least two planned queries addressed to the DBMS, information being requested by the planned queries of the generated query plan includes all information being requested by the plural queries of the selected query pattern; and query plan orchestrator circuitry configured to:
send at least a part of the planned queries of the generated query plan to the DBMS, at least one sent planned query is a request for information from which a corresponding query has not yet been received from the database client, and store the information returned from the DBMS in response to the sent planned queries in the storage, wherein there are plural existing query plans stored in the storage, each existing query plan having a QoS figure associated therewith, and wherein to generate the query plan, the query plan manager circuitry is configured to:
for each compatible existing query plan that can be used to carry out the selected query pattern, compare the QoS figure of that existing query plan with the QoS measure associated with the received query set, and select one of the compatible existing query plans whose QoS figure best matches the determined QoS measure as the generated query pattern based on the comparison result.

13. The DAQO apparatus of claim 12, wherein a number of the planned queries of the generated query plan is less than a number of the plural queries of the selected query pattern.

14. The DAQO apparatus of claim 12,
wherein the received query set from the database client is an initial received query set, wherein the connector is configured to receive a subsequent received query addressed to the DBMS, the subsequent received query being received subsequent to the initial received query set, and wherein the query plan orchestrator circuitry is configured to retrieve information requested in the subsequent received query from the storage, and to send the retrieved information to the database client, the returned information having been received from the DBMS in response to the sent planned queries.

15. The DAQO apparatus of claim 12, wherein the DAQO apparatus is interposed between the database client and the DBMS.

* * * * *

UNITED STATES PATENT AND TRADEMARK OFFICE
CERTIFICATE OF CORRECTION

PATENT NO. : 9,251,211 B2
APPLICATION NO. : 13/817638
DATED : February 2, 2016
INVENTOR(S) : Manzano Macho et al.

It is certified that error appears in the above-identified patent and that said Letters Patent is hereby corrected as shown below:

IN THE SPECIFICATION

In Column 2, Line 14, delete "schemes" and insert -- schemas --, therefor.

In Column 5, Line 37, delete "($A'_1, A'_2$...)." and insert -- ($A'_1, A'_2, ...$). --, therefor.

In Column 7, Line 11, delete "detection"" and insert -- detection" or --, therefor.

In Column 7, Line 65, delete "shown." and insert -- shown --, therefor.

In Column 8, Line 4, delete "INS system, a plurality messages" and
insert -- IMS system, a plurality of messages --, therefor.

In Column 8, Line 55, delete "a S-CSCF" and insert -- an S-CSCF --, therefor.

In Column 8, Line 56, delete "I-CSCE)." and insert -- I-CSCF). --, therefor.

In Column 9, Line 5, delete "Therefore;" and insert -- Therefore, --, therefor.

In Column 9, Line 25, delete "(M1)," and insert -- (M1, --, therefor.

In Column 9, Line 65, delete "$Q_1(A\sqsupset, Q_2$" and insert -- $Q_1[A\square, A_1], Q_2$ --, therefor.

In Column 10, Line 19, delete "160)of" and insert -- 160) of --, therefor.

In Column 10, Line 27, delete "if" and insert -- if, --, therefor.

In Column 10, Line 45, delete "BF" and insert -- BE --, therefor.

Signed and Sealed this
Thirty-first Day of May, 2016

Michelle K. Lee
*Director of the United States Patent and Trademark Office*

CERTIFICATE OF CORRECTION (continued)
U.S. Pat. No. 9,251,211 B2

IN THE SPECIFICATION

In Column 11, Line 57, delete "($B_1$ $B_2$, $B_3$)]," and insert -- ($B_1$, $B_2$, $B_3$)], --, therefor.

In Column 11, Line 59, delete "Q1-Q5" and insert -- $Q_1$-$Q_5$ --, therefor.

In Column 12, Line 39, delete "actions" and insert -- actions for --, therefor.

In Column 12, Line 60, delete "that" and insert -- than --, therefor.

In Column 13, Line 11, delete "QUO 101" and insert -- QPO 101 --, therefor.

In Column 13, Line 26, delete "582," and insert -- S82, --, therefor.

In Column 14, Line 31, delete "230," and insert -- 230 --, therefor.